(12) United States Patent
Oh

(10) Patent No.: US 7,622,169 B2
(45) Date of Patent: Nov. 24, 2009

(54) EMBLEM ASSEMBLY OF AUTOMOBILE

(75) Inventor: Hyung Kwan Oh, Seoul (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 706 days.

(21) Appl. No.: 11/305,086

(22) Filed: Dec. 19, 2005

(65) Prior Publication Data

US 2007/0035111 A1    Feb. 15, 2007

(30) Foreign Application Priority Data

Aug. 9, 2005    (KR) .................... 10-2005-0073018

(51) Int. Cl.
*B60R 13/00* (2006.01)
*B44F 1/10* (2006.01)
*G09F 7/00* (2006.01)

(52) U.S. Cl. ..................... 428/31; 428/29; 40/584; 40/593

(58) Field of Classification Search ............. 428/29, 428/30, 31; 40/584, 593
See application file for complete search history.

(56) References Cited

U.S. PATENT DOCUMENTS 3,879,876 A * 4/1975 Morgan .............. 40/327
4,767,647 A * 8/1988 Bree ................... 428/14
2003/0082318 A1* 5/2003 Jacobs ................ 428/31

* cited by examiner

*Primary Examiner*—Timothy M Speer
*Assistant Examiner*—Gordon R Baldwin
(74) *Attorney, Agent, or Firm*—Greenblum & Bernstein, P.L.C.

(57) ABSTRACT

An emblem assembly of an automobile is disclosed. Because a pad and a thin plate are fabricated as separate components and then fixed to a cover, a symbol formed on the thin plate can be effectively exposed to a user through respective material colors of the pad and the thin plate themselves. In addition, since the pad is made of the plastic material, different from the other pad made of the conventional metal material, the circumferential edge portion of the pad would not be torn as in the related art although the thickness of the circumferential edge portion is relatively thick, and the difference of material colors between the pad and the thin plate can enhance the conspicuousness characteristics of the emblem.

8 Claims, 4 Drawing Sheets

EMBLEM ASSEMBLY OF AUTOMOBILE

This Nonprovisional application claims priority under 35 U.S.C. §119(a) on Patent Application No. 10-2005-73018 filed in Korea on Aug. 9, 2005, the entire contents of which are hereby incorporated by reference.

BACKGROUND OF THE INVENTION

1. Field of the Invention

The present invention relates to an emblem assembly of an automobile and, more particularly, to an emblem assembly of an automobile having excellent fixation characteristics in its installation and superior surface-finishing effect and three-dimensional effect.

2. Description of the Related Art

FIG. 1 is a perspective view showing a general emblem of an automobile. As shown in FIG. 1, the general emblem 2 of the automobile is fixedly attached on a cover 1 of the automobile.

The emblem 2 is made of aluminum, and a symbol 3 is shaped on an upper surface of the emblem. In order to have a three-dimensional effect, the symbol 3 is formed to be intagliated or embossed.

In this respect, however, when an edge portion 4 of the emblem 2 with the symbol 3 formed therein is thick, the edge portion 4 of the emblem 2 made of the metal material can be torn (broken) in a shaping process.

Thus, in case of the general emblem 2, in order to prevent the emblem from being torn, the emblem 2 is intentionally made of a material such as plastic, but in this case, a problem arises in that the portion of the symbol 3 of the emblem 2 is not sufficiently exposed visually to users.

In addition, when the surface of the emblem 2 made of plastic is processed through a printing method or the like, the number of processes is increased and a heavy metal added in the surface processing process is problematic.

SUMMARY OF THE INVENTION

The present invention is designed to solve such problem of the related art, and therefore, an object of the present invention is to provide an emblem assembly of an automobile capable of effectively providing a three-dimensional effect to users, being easily fixed, and not requiring surface-processing.

To achieve the above object, there is provided an emblem assembly of an automobile according to a first aspect of the present invention, including: a cover; a thin plate with a symbol formed thereon; and a pad positioned between the thin plate and the cover and fixedly bonded with the thin plate and installed at the cover, wherein the pad includes valleys for receiving an adhesive when it is fixedly bonded to the thin plate.

Herein, the thin plate and the pad are made of a material in different color, respectively, and specifically, the thin plate is made of a metal material and the pad is made of a synthetic resin.

The symbol of the thin plate is formed to be intagliated or embossed.

The pad includes a plurality of valleys formed thereon, and the valleys have some different shapes and are formed in at least one or more shapes of a concentric circle, a triangle and a circle.

In particular, the pad is formed such that its upper surface is lower than an upper end of its circumferential edge portion to receive a portion or the entirety of the thickness of the thin plate and a slant surface is formed at the circumferential edge portion.

The pad and the cover are fixed by rivets, for which the rivets are integrally formed at a lower side surface of the pad and insertion holes are formed on the cover to allow the rivets to penetrate therethrough.

The cover includes a recess to receive the pad therein with a certain depth.

To achieve the above object, there is provided an emblem assembly of an automobile according to a second aspect of the present invention, including: a cover; a thin plate made of a metal material; and a pad positioned between the thin plate and the cover, fixedly bonded with the thin plate, made of a synthetic material, and installed on the cover, wherein the pad includes valleys for receiving an adhesive when it is fixedly bonded to the thin plate.

The pad includes a plurality of valleys formed thereon, and the valleys have some different shapes and are formed in at least one or more shapes of a concentric circle, a triangle and a circle.

The pad is formed such that its upper surface is lower than an upper end of its circumferential edge portion to receive a portion or the entirety of the thickness of the thin plate.

The pad and the cover are fixed by rivets, for which the rivets are integrally formed at a lower side surface of the pad and insertion holes are formed on the cover to allow the rivets to penetrate therethrough.

As for the emblem assembly of an automobile, since the pad and the thin plate are constructed as separate components and then fixed on the cover, a symbol formed on the thin plate can be effectively transferred to a user through color of the pad and the material of the thin plate itself which are formed as separate components.

In addition, as for the emblem assembly of an automobile in accordance with the present invention, since the own color of each material of the thin plate, the pad or the cover is used as it is, a coloring or plating process is not required.

Moreover, as for the emblem assembly of an automobile in accordance with the present invention, since a large amount of adhesive can be received in the valleys formed on the pad, the adhesive force can be enhanced, and in this respect, since the valleys are formed in various shapes, the adhesive force can be further increased in various directions.

Furthermore, as for the emblem assembly of an automobile in accordance with the present invention, since the valleys are formed on the pad and the adhesive is received in the valleys of the pad, overflow of the adhesive to outside the pad can be prevented even if an amount of the adhesive applied to the thin plate and the pad changes.

Also, as for the emblem assembly of an automobile in accordance with the present invention, even if the adhesive applied to the thin plate and the pad is not centered with the pad, an overflow of the adhesive to outside the pad can be prevented because the applied adhesive moves along the valleys during a bonding process of the thin plate and is entirely received in the valleys.

In addition, as for the emblem assembly of an automobile in accordance with the present invention, since the pad is rivet-coupled with the cover, it can be firmly fixed on the cover.

Also, as for the emblem assembly of an automobile in accordance with the present invention, since the pad is made of the plastic material, different from the other pad made of the conventional metal material, the circumferential edge portion of the pad would not be torn as in the related art although the thickness of the circumferential edge portion is relatively thick, and the difference of material colors between the pad and the thin plate can enhance the conspicuousness characteristics of the emblem.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

An emblem assembly of an automobile in accordance with the present invention will now be described with reference to the accompanying drawings.

There can be a plurality of embodiments of the emblem assembly of an automobile in accordance with the present invention, the most preferred ones of which will now be described.

Figure 1:
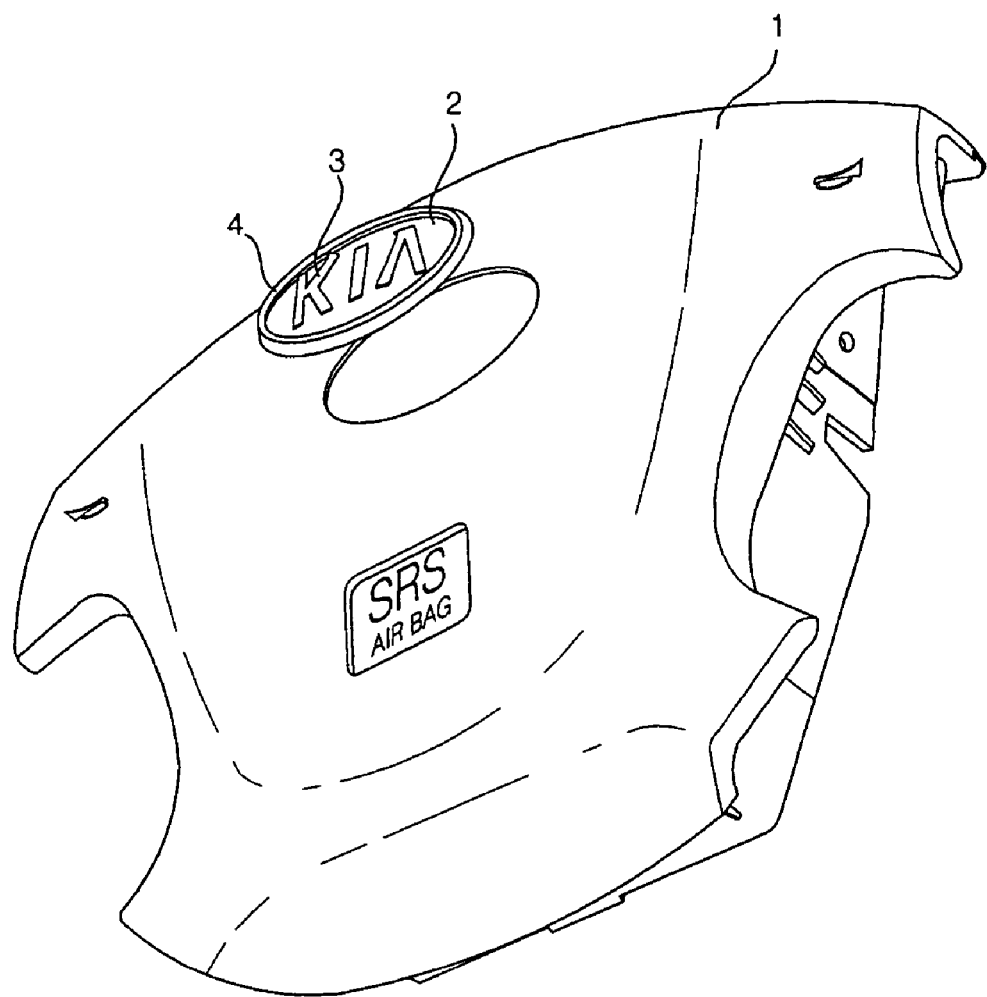
FIG. 1 is a perspective view of an emblem of a general automobile.
Figure 2:
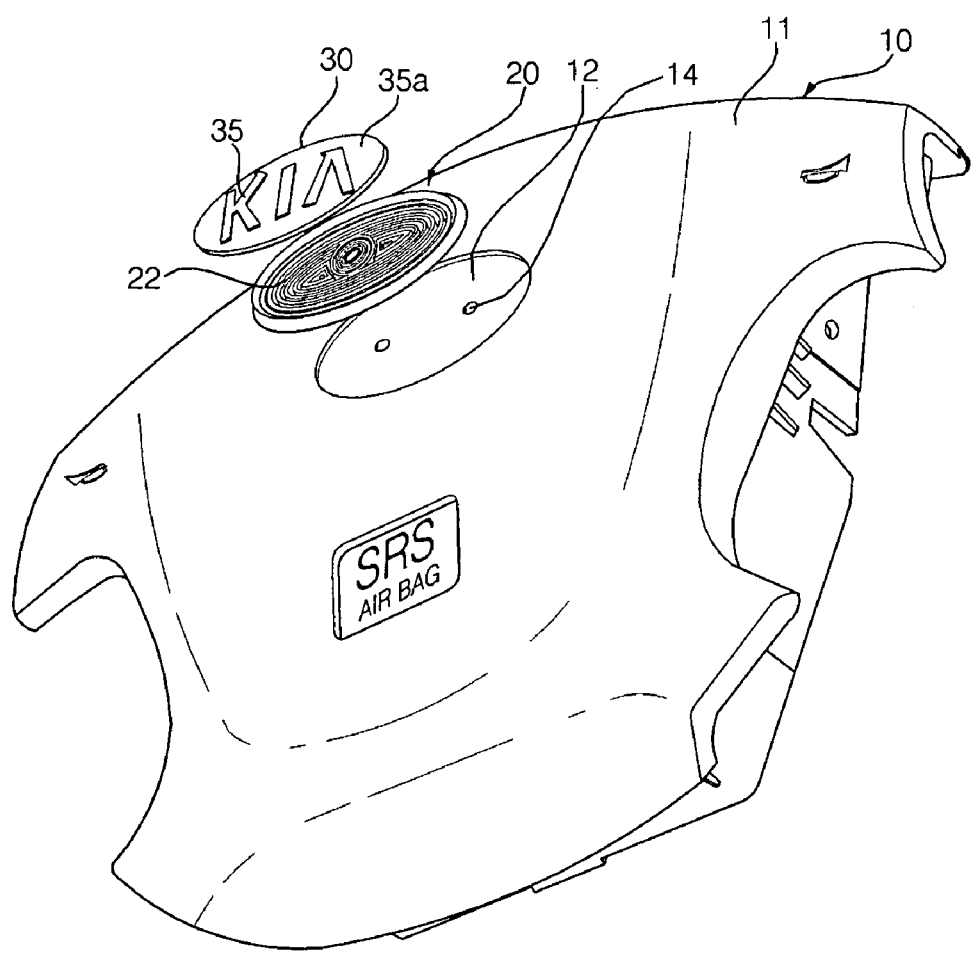
FIG. 2 is an exploded perspective view of an emblem assembly of an automobile in accordance with the present invention.
Figure 3:
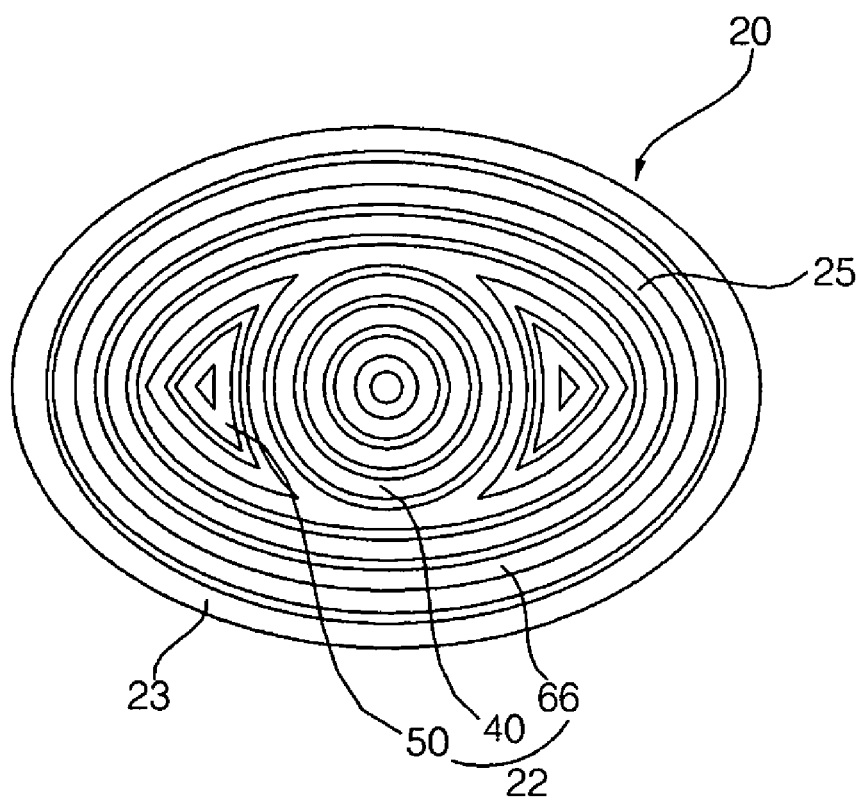
FIG. 3 is a plan view of a pad of the emblem assembly in accordance with the present invention.
Figure 4:
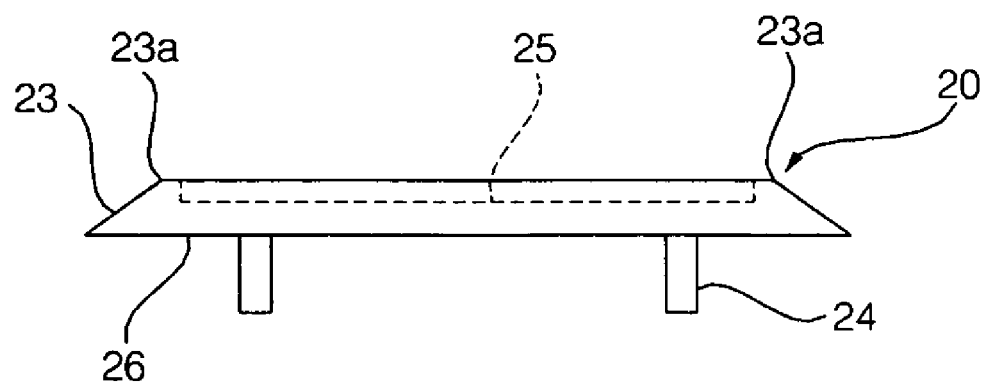
FIG. 4 is a side sectional view of the pad of the emblem assembly in accordance with the present invention.

FIG. 2 is an exploded perspective view of an emblem assembly of an automobile in accordance with the present invention, FIG. 3 is a plan view of a pad of the emblem assembly in accordance with the present invention, and FIG. 4 is a side sectional view of the pad of the emblem assembly in accordance with the present invention.

As shown in FIG. 2, the emblem assembly of an automobile in accordance with the present invention includes a cover 10 installed on a steering wheel, a pad 20 rivet-fixed on the cover 10, and a thin plate 30 fixedly bonded onto the pad 20.

The cover 10 includes a recess 12 in which the pad 20 is mounted, and when the pad 20 is mounted in the recess 12, a portion thereof is inserted to an inner side of the cover 10.

As shown in FIGS. 2 and 4, the pad 20 includes valleys 22 for receiving an adhesive by which the pad 20 can be fixedly bonded with the thin plate 30, and rivets 24 are formed at a lower side surface 26 of the pad 20 and used for the pad 20 to be fixed to the cover 10.

Here, the recess 12 of the cover 10 includes insertion holes 14 through which the rivets 24 penetrate, and in this case, the rivets 24 penetrate the insertion holes 14 and are protruded from a rear surface of the cover 10.

An outer circumferential edge portion of the pad 20 includes a slant surface 23 protruded upwardly so as to be discerned from an outer surface 11 of the cover 10, and an upper side surface 25 of the pad 20 where the valleys 22 are formed is lower than an upper end 23a of the slant surface 23.

Accordingly, when the thin plate 30 is fixed on the pad 20, an upper surface 35a of the thin plate 30 can be higher than or as high as the upper end 23a of the pad 20.

The valleys 22 for evenly receiving the adhesive are formed on the upper side surface 25 of the pad 20, and have certain shapes in a multi-axial direction in order to generate a fixing force in various direction with respect to the thin plate 30.

That is, as shown in FIG. 3, some valleys are formed with several concentric circles 40 at a central portion of the upper side surface 25, some valleys in a triangular shape (◁ and ▷) 50 are formed at both sides of the concentric circles 40, and some valleys in a circular shape 60 are formed at an outer side of the valleys of concentric circles 40 and valleys in the triangular shape 50 in a surrounding manner.

Accordingly, when the thin plate 30 is fixed on the pad 20, the adhesive received in the valleys 40, 50 and 66 of the pad 20 generates an adhesive force in several directions with respect to the thin plate 30.

Because the valleys 40, 50 and 66 can receive a large amount of the adhesive compared with a plane surface, a stronger adhesive force can be generated.

Herein, the pad 20 is made of a plastic material, and preferably, it is injection-molded.

With reference to FIGS. 2 and 4, the rivets 24 formed at the lower side surface of the pad 20 are inserted into the insertion holes 14 of the cover 10 and then rivet-processed at a rear surface of the cover 10, thereby being fixed to the cover 10.

As shown in FIG. 2, the thin plate 30 is fixedly bonded on the upper side surface 25 of the pad 20. A symbol 35 is formed to be intagliated or embossed on the upper side surface of the thin plate 30. Preferably, the symbol 35 is formed through press processing.

Unlike those in the related art, the cover 10, the pad 20 and the thin plate 30 are formed as separate components, and they can be made of a different material.

Specifically, in this embodiment of the present invention, the cover 10 is made of the same synthetic resin as that of the steering wheel (not shown), the pad 20 is made of a synthetic resin such as plastic to facilitate formation of the valleys 22 but in different color from that of the cover 10 for color discrimination, and the thin plate 30 is made of a metal material 30 so as to be discriminated from the cover 10 or the pad 20.

Accordingly, when the thin plate 30 and the pad 20 are fixed on the cover 10, the thin plate 30 is conspicuously exposed and the slant surface 23 of the pad 20 is also conspicuously exposed at an edge portion of the thin plate 30 to a user.

Herein, since the thin plate 30 is made of a metal material, the symbol 35 formed on the thin plate 30 can be effectively exposed to the user through the glossy metal material itself of the thin plate 30, and in addition to this, since the pad 2 is formed in a different color from that of the cover 10 and the thin plate 30, the conspicuousness of the thin film 30 can be further increased.

Because the cover 10, the pad 20 and the thin plate 30 have their own respective color of their own material, surface coloring is not necessary.

The emblem assembly of an automobile in accordance with the present invention has many advantages as follows.

First, since the pad and the thin plate are fabricated as separate components and then fixed to the cover, the symbol formed on the thin plate can be effectively exposed to a user through respective material colors of the pad and the thin plate themselves.

Second, since the respective material colors of the thin plate, the pad and the cover are used as it is, a separate coloring or plating process is not necessary.

Third, since a large amount of the adhesive can be received in the valleys formed on the pad, the adhesive force can be improved, and in addition, since the valleys are formed with various shapes, the adhesive force can be further increased in various directions.

Fourth, even if the adhesive applied to the thin plate and the pad is not centered with the pad, an overflow of the adhesive to outside the pad can be prevented because the applied adhesive moves along the valleys during a bonding process of the thin plate and is entirely received in the valleys.

Fifth, since the pad is rivet-coupled to the cover, the pad can be firmly fixed on the cover.

Sixth, since the pad is made of the plastic material, different from the other pad made of the conventional metal material, the circumferential edge portion of the pad would not be torn as in the related art although the thickness of the circumferential edge portion is relatively thick, and the difference of material colors between the pad and the thin plate can enhance the conspicuousness characteristics of the emblem.

The foregoing description of the preferred embodiments of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

What is claimed is:

1. An emblem assembly of an automobile comprising:
a cover;
a thin plate with a symbol formed thereon; and
a pad positioned between the thin plate and the cover and fixedly bonded with the thin plate and installed at the cover,
wherein the pad includes valleys formed thereon for receiving an adhesive, the valleys comprising several concentric circles at a central portion of an upper side surface of the pad, triangular shaped valleys formed at both sides of the concentric circles, and circular shaped valleys surrounding the triangular shaped valleys such that the valleys evenly receive an adhesive and generate a fixing force in various directions with respect to the thin plate,
and wherein the cover includes a recess into which the pad is insertedly installed with a certain depth.

2. The emblem assembly of claim 1, wherein the thin plate is made of a metal material.

3. The emblem assembly of claim 1, wherein the pad is made of a synthetic resin.

4. The emblem assembly of claim 1, wherein the symbol of the thin plate is formed to be intagliated or embossed.

5. The emblem assembly of claim 1, wherein the pad is formed such that its upper surface is lower than an upper end of its circumferential edge portion to receive a portion or the entirety of the thickness of the thin plate.

6. The emblem assembly of claim 1, wherein a slant surface is formed at the circumferential edge portion of the pad.

7. The emblem assembly of claim 1, wherein the pad and the cover are fixed by rivets.

8. The emblem assembly of claim 7, wherein the rivets are integrally formed at a lower side surface of the pad and insertion holes are formed on the cover to allow the rivets to penetrate therethrough.

* * * * *